United States Patent
McAllister et al.

(10) Patent No.: US 11,585,614 B2
(45) Date of Patent: Feb. 21, 2023

(54) FILL SUPPORT ASSEMBLY

(71) Applicant: Evapco, Inc., Taneytown, MD (US)

(72) Inventors: Bruce A. McAllister, Taneytown, MD (US); Ronald D. Forest, Taneytown, MD (US); John H. Ahern, Taneytown, MD (US)

(73) Assignee: Evapco, Inc., Taneytown, MD (US)

( * ) Notice: Subject to any disclaimer, the term of this patent is extended or adjusted under 35 U.S.C. 154(b) by 81 days.

(21) Appl. No.: 17/320,810

(22) Filed: May 14, 2021

(65) Prior Publication Data
US 2022/0364804 A1 Nov. 17, 2022

(51) Int. Cl.
*F28F 25/08* (2006.01)
*F28C 1/00* (2006.01)

(52) U.S. Cl.
CPC .............. *F28F 25/082* (2013.01); *F28C 1/00* (2013.01); *F28F 25/087* (2013.01)

(58) Field of Classification Search
CPC .......... F28C 1/00; F28F 25/082; F28F 25/087
USPC ........................................................ 261/111
See application file for complete search history.

(56) References Cited

U.S. PATENT DOCUMENTS

| | | | | |
|---|---|---|---|---|
| 2,002,065 A | * | 5/1935 | Kryszewski .......... | F28F 25/082 261/109 |
| 4,115,484 A | * | 9/1978 | Saxton ................. | F28F 25/082 261/DIG. 11 |
| 4,178,333 A | * | 12/1979 | Shepherd ............. | F28F 25/082 261/DIG. 11 |
| 4,181,693 A | * | 1/1980 | Swindt ................. | F28C 1/02 261/DIG. 11 |
| 7,618,026 B2 | * | 11/2009 | Armstrong ............ | F28F 25/082 52/654.1 |
| 9,291,395 B2 | * | 3/2016 | Roth .................... | F28F 25/082 |
| 9,546,830 B2 | * | 1/2017 | Kreil ..................... | B23P 15/26 |
| D843,600 S | * | 3/2019 | Schmidt ................ | D25/126 |
| 10,302,377 B2 | * | 5/2019 | Powell ................. | F28F 25/082 |
| 10,302,378 B2 | * | 5/2019 | Schmidt ............... | F28F 25/082 |
| 2004/0099968 A1 | * | 5/2004 | Olson .................. | F28F 25/082 261/DIG. 11 |

* cited by examiner

*Primary Examiner* — Charles S Bushey
(74) *Attorney, Agent, or Firm* — Whiteford, Taylor & Preston, LLP; Peter J. Davis (57) ABSTRACT

A fill support grid hanger for hanging a full support grid from a horizontal structural member that obviates the need for an intervening spacer bar. The hanger features a flange at the top, a plurality of blocks in the back to stabilize the hanger on the horizontal structural member, and three-dimensional features on the front side to receive and prevent lateral movement of two or more different types of fill support grids.

9 Claims, 12 Drawing Sheets

FIG.1 PRIOR ART

PRIOR ART

FIGURE 2

PRIOR ART

FIGURE 3

PRIOR ART

PRIOR ART

FILL SUPPORT ASSEMBLY

BACKGROUND OF THE INVENTION

Field of the Invention

The present invention relates to cooling towers that employ splash bar-type fill for direct heat exchange between water and air.

Description of the Background

Cooling towers of various types and sizes are well known in the art. Some cooling towers are a cross-flow type whereby cooling air flows crosswise relative to downwardly-raining heated water. Other cooling towers are a counter-flow type whereby cooling air flows diametrically to the downwardly-raining heated water. Some cooling towers, regardless of their type, are constructed in a manufacturing plant and shipped to the required location for installation, while other cooling towers, particularly large ones, are erected in the field at the required location.

Figure 1:
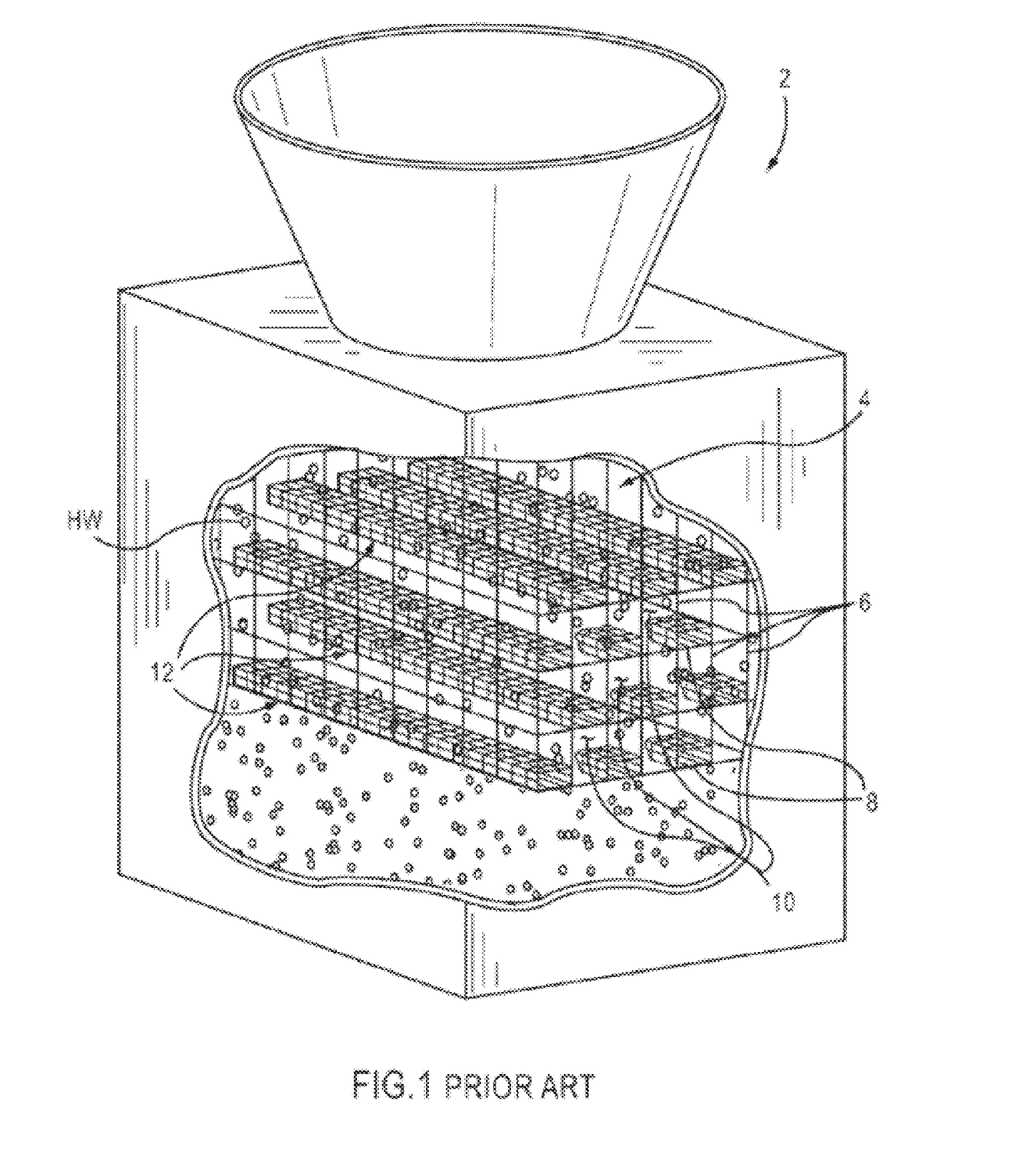
FIG. 1 is a perspective cut-away representation of a cooling tower with splash fill supported in a fill support grid according to the prior art.

A prior art cooling tower 2 is illustrated by way of example in FIG. 1. A fill support grid 4 is supported inside the cooling tower 2.

Cooling tower fill support grids 4 are used to support splash bars 12 which span across a cooling tower, so that the splash bars do not sag. The splash bars 12 are offset both vertically and horizontally, so that water droplets falling vertically from near the top of the cooling tower will invariably strike one or more of the splash bars during descent. Large water droplets are broken into smaller water droplets upon striking one of the splash bars. As many water droplets strike the splash bars, a thin film of water tends to form on each splash bar which increases the surface area of water exposed to air to enhance the cooling effect of the cross-flowing air or the counter-flowing air.

The fill support grid 4 includes a plurality of vertical hanger support members 6 attached at an upper portion of the cooling tower 2 and a plurality of horizontal hanger support members 8 that are connected to the vertical hanger support members to form a matrix of splash bar compartments or "windows" 10 for receiving individual ones of the splash bars 12. Typically, individual ones of the splash bars 12 are horizontally inserted into alternating vertical and horizontal ones of the splash bar windows 10 as shown in FIG. 1.

One method for securing the fill support grid in the cooling tower is shown and described in U.S. Pat. No. 7,618,026, in which the top of the fill support grid is formed with a flange that is configured to rest atop and be nailed or screwed to a horizontal wooden structural member.

Figure 2:
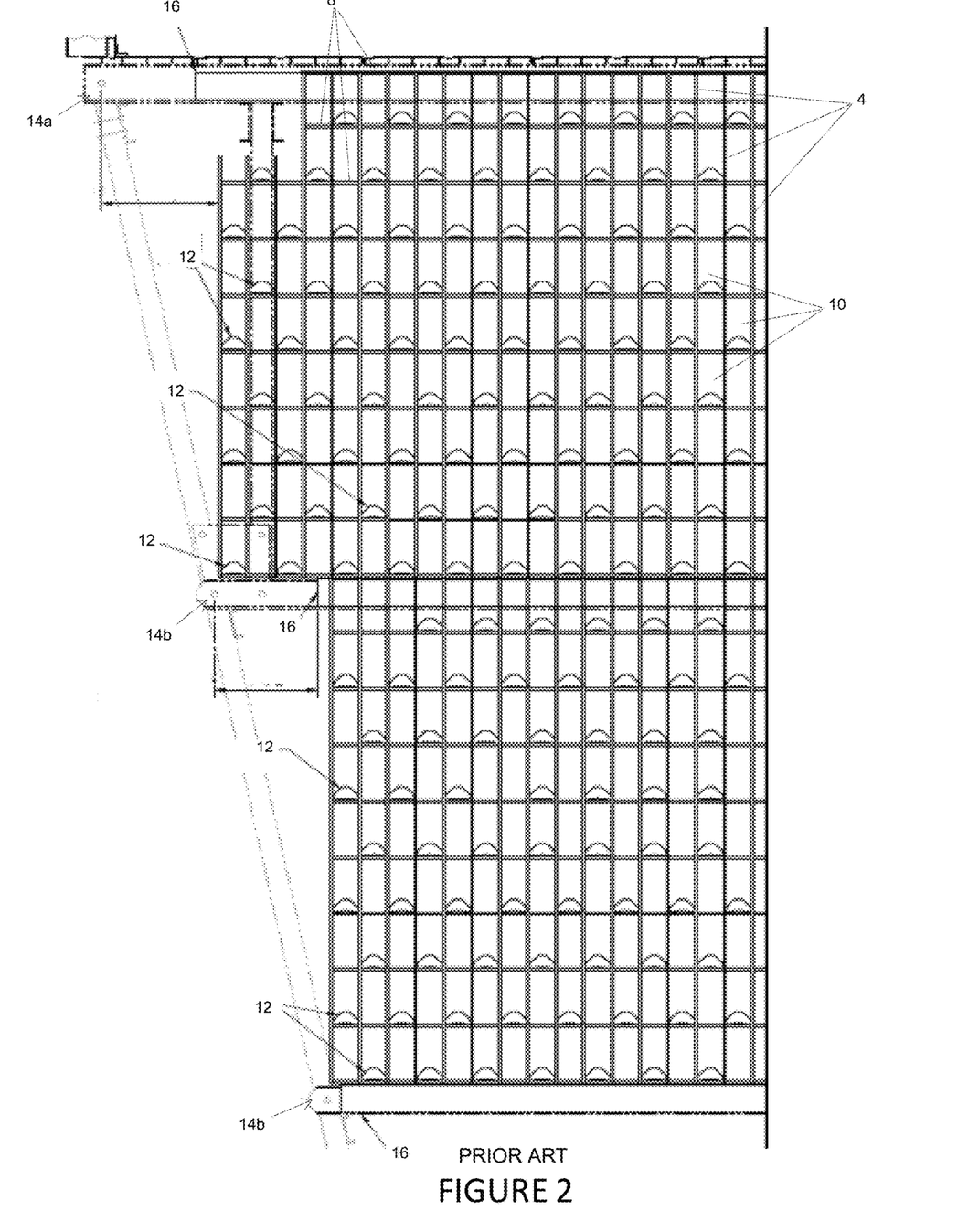
FIG. 2 shows a plan view of splash bar fill supported in a fill support grid according to another prior art cooling tower arrangement.
Figure 3:
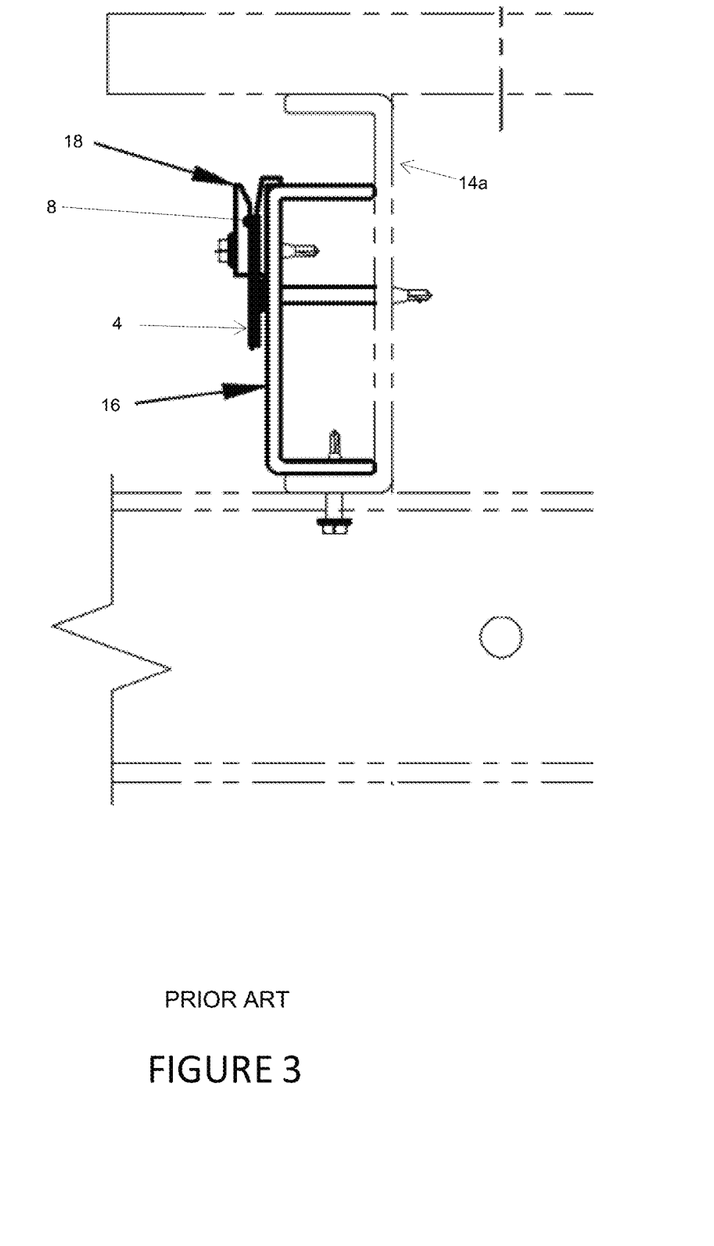
FIG. 3 is a close-up view of a fill support grid attachment according to a first prior art attachment arrangement.
Figure 4:
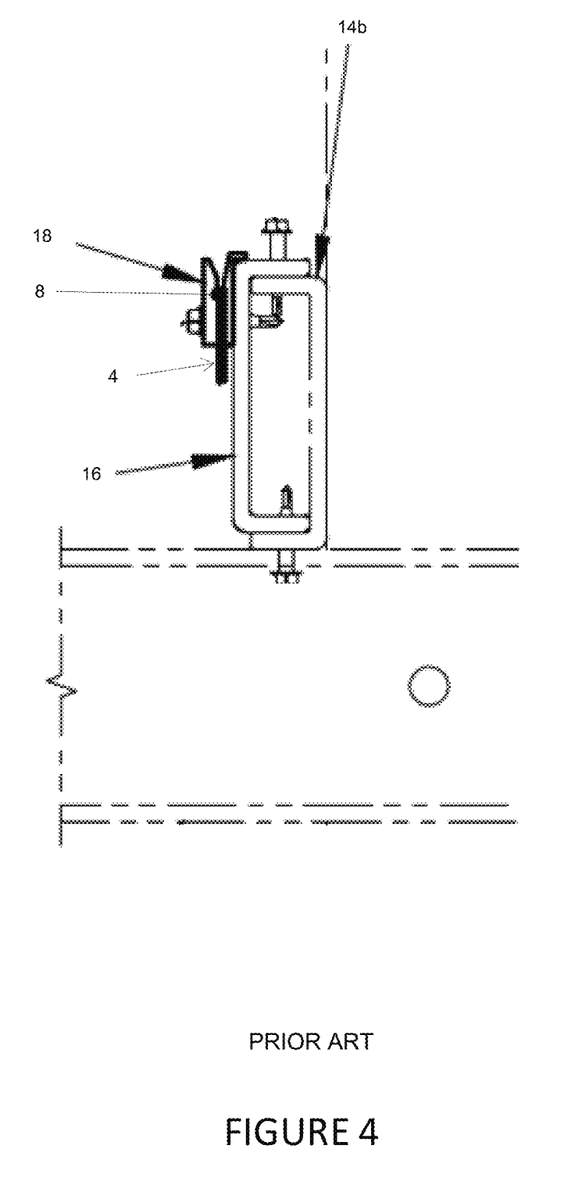
FIG. 4 is a close-up side view of a fill support grid attachment according to a second prior art attachment arrangement.
Figure 5:
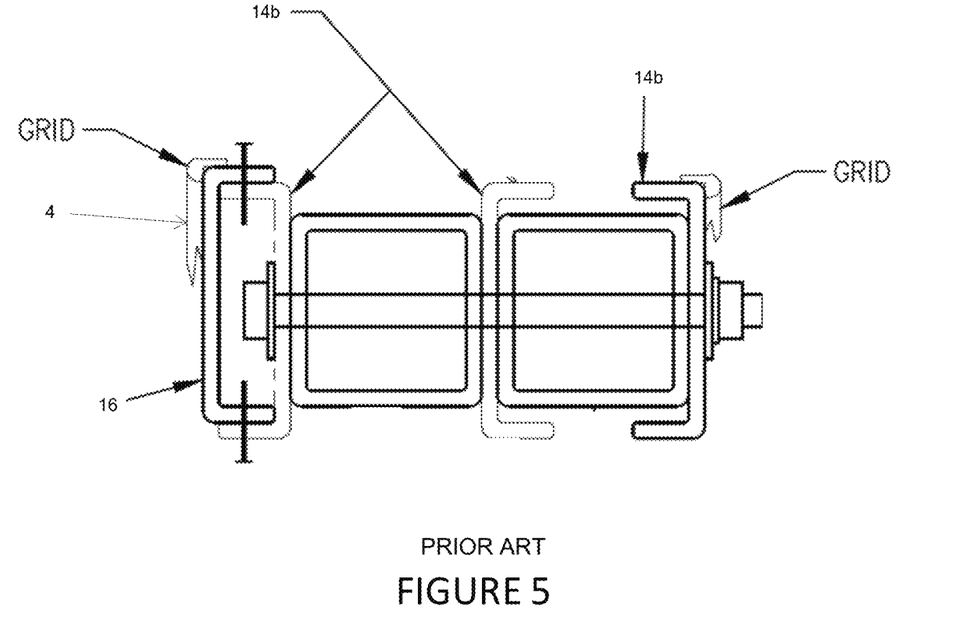
FIG. 5 is a close-up side view of a fill support grid attachment according to a third prior art attachment arrangement.
Figure 6:
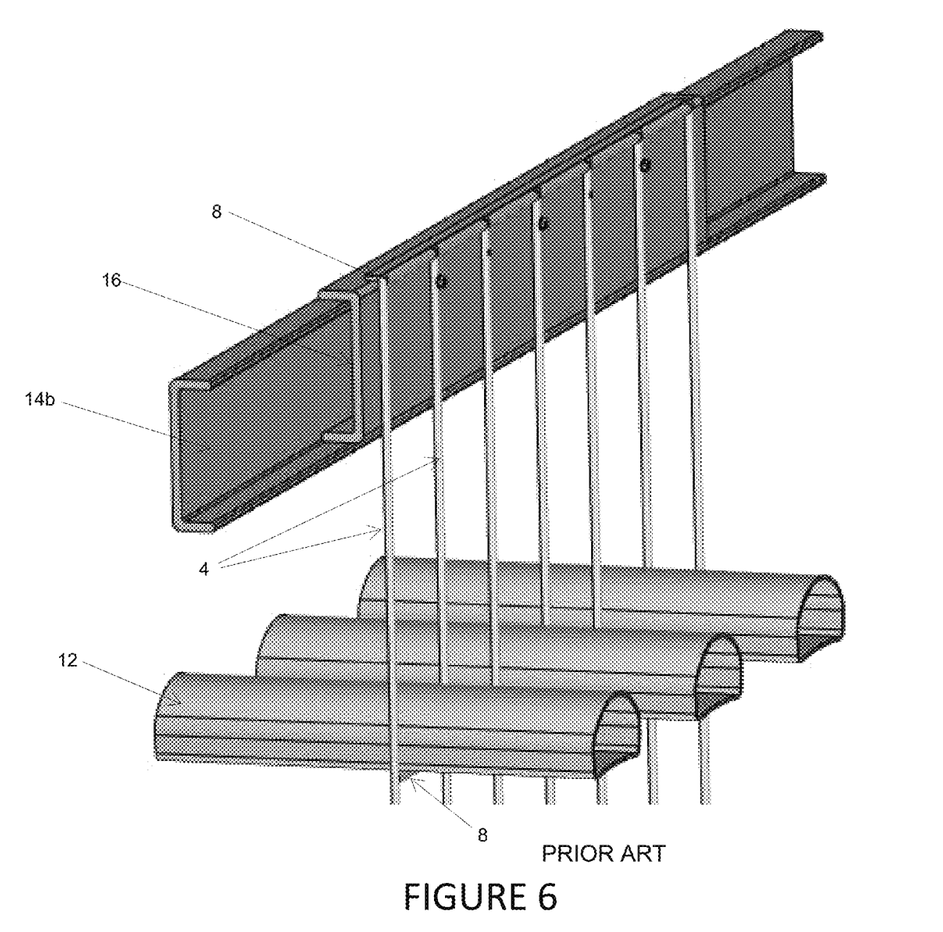
FIG. 6 is a perspective view of the prior art fill support grid attachment arrangement shown in FIG. 5.

Another example of prior art methods and devices for securing the fill support grid to the cooling tower is shown in FIGS. 2-4, in which horizontal structural members 14*a*, 14*b* of the cooling tower (which may include girts, joists and/or beams) are first provided with intervening spacer bars 16 that either sit atop the bottom flange of a tall girt, joist or beam 14*a*, see FIG. 3, or that nest with the bottom and top flanges of a standard-sized girt, joist or beam 14*b*, see FIG. 4. In both cases, the intervening spacer bar 16 is secured to its corresponding horizontal structural member 14*a* or 14*b* with bolts or screws. Then, a grid hanger 18 is secured to the intervening spacer bar, also with bolts or screws. Finally, the fill support grid 4 is hung from the grid hanger 18, and fixed in place with screws. FIGS. 5 and 6 show another use of the intervening spacer bar 16 in which the fill support grid 4 is attached directly to the intervening spacer bar 16. FIG. 5 also shows an embodiment of the prior art in which the fill support grid 4 is attached directly to a horizontal structural member 14*b*.

SUMMARY OF THE INVENTION

The present invention is a novel and unobvious device for securing splash bar fill support grids in a cooling tower. According to a first embodiment, the invention is a fill support grid hanger constituting an elongated body or "rail," having at its top a flange for optionally resting atop the top flange of a horizontal structural member, having on one side, plurality of integrally formed blocks that extend away from a longitudinal axis of the rail a distance equal to or greater than the length of the flange in order to contact the central portion of a horizontal structural member and prevent undue flexing of the rail toward and away from the horizontal structural member. The flange and the integrally formed blocks form a recess for receiving the top flange of a horizontal structural member. The side of the rail opposite the integrally formed blocks is provided with three-dimensional surface features configured to receive and inhibit lateral movement of at least two different types of fill support grid. According to a further embodiment, the rail may be provided with bores located and spaced appropriately to receive screws or bolts to secure the fill support grid to the rail.

According to an alternate embodiment, adapted for attachment to horizontal structural members having a wider span between upper and lower flanges, and where the desired or appropriate location for securing the fill support grid is between the two flanges, some or all of the plurality of blocks may be configured to extend downward to the lower flange of the horizontal structural member to support the fill support grid hanger an appropriate distance above the lower flange.

The fill support grid hangers of the invention may be formed by molding, 3D printing, or other conventional means.

Accordingly, there is provided according to the invention a cooling tower fill support grid hanger for securing a fill support grid to a cooling tower horizontal structural member, the cooling tower fill support grid hanger comprising a longitudinal rail having a back surface and a front surface, a top portion of the back surface comprising a flange extending from the back surface, a lower portion of the back surface comprising a plurality of integrally formed blocks extending away from the back surface, the flange and the plurality of blocks forming a first discontinuous channel dimensioned and configured to receive the top flange of a cooling tower horizontal structural member in a slip fit; the front surface comprising a plurality of grid supports spaced from one-another along the front face.

According to a further embodiment of the invention, the plurality of blocks also extend downward beyond a bottom surface of the rail, the downward extension dimensioned and configured to support the fill support grid hanger on a bottom flange of a cooling tower horizontal structural member.

According to a further embodiment of the invention, the plurality of grid supports define a plurality of channels configured and dimensioned to receive vertical portions of a cooling tower fill support grid.

According to a further embodiment of the invention, the plurality of grid supports define a second discontinuous channel between back surfaces of the plurality of grid supports and the front surface of the rail, the second discontinuous channel configured and dimensioned to receive a horizontal portion of a cooling tower fill support grid.

According to a further embodiment of the invention, the back surfaces of the plurality of grid supports are tapered.

According to a further embodiment of the invention, the plurality of grid supports are each U-shaped.

According to a further embodiment of the invention, the plurality of blocks have a step-shaped top surface.

According to a further embodiment of the invention, the front faces of the grid supports define recesses.

According to a further embodiment of the invention, the rear faces of the blocks define recesses.

Features in the attached drawings are numbered with the following reference numerals:

| | |
|---|---|
| 2 | cooling tower |
| 4 | fill support grid |
| 6 | vertical hanger support member |
| 8 | horizontal hanger support member |
| 10 | splash bar window |
| 12 | splash bar |
| 14a | horizontal structural member, tall |
| 14b | horizontal structural member, standard |
| 16 | intervening spacer bar |
| 18 | prior art grid hanger |
| 101 | grid hanger |
| 103 | longitudinal body/rail |
| 105 | first side |
| 107 | second side |
| 109 | flange |
| 111 | integrally formed blocks |
| 113 | tops of blocks |
| 114 | flange channel |
| 115 | recesses in longitudinal body/rail |
| 117 | recesses in blocks |
| 119 | grid supports |
| 120 | front channels |
| 121 | slot |
| 123 | back side of three-dimensional surface features |
| 125 | bores |

DETAILED DESCRIPTION

Figure 7:
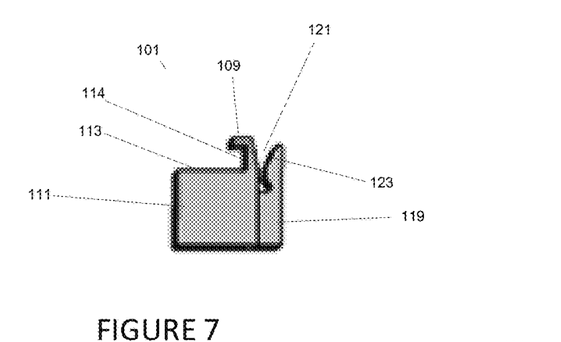
FIG. 7 is a side view of a fill support grid hanger according to a first embodiment of the invention.
Figure 8:
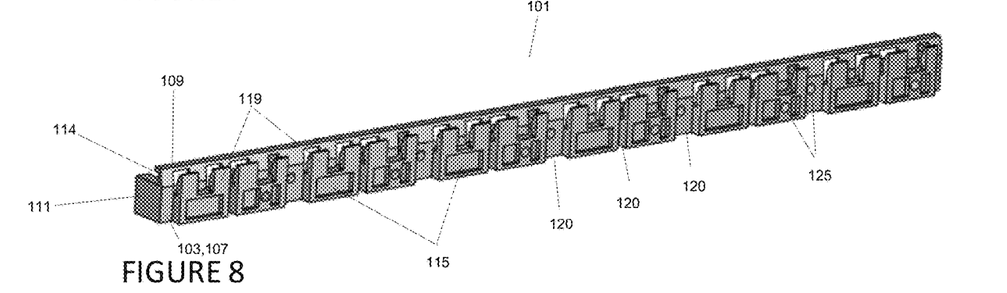
FIG. 8 is a front perspective view of the fill support grid hanger of FIG. 7.
Figure 9:
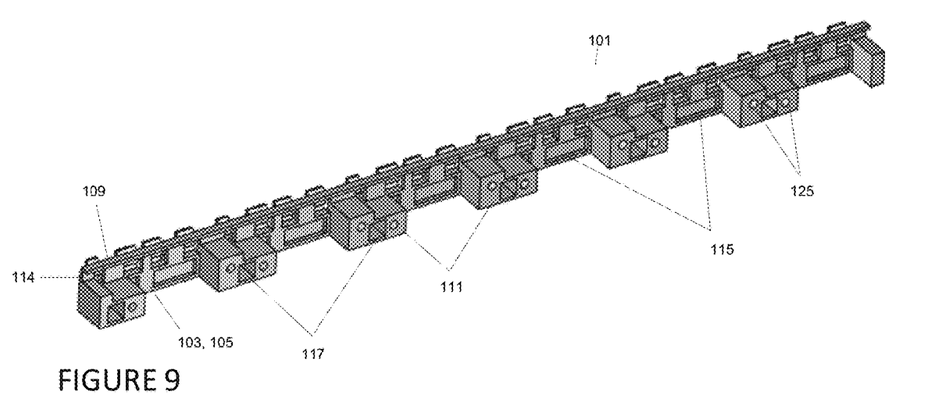
FIG. 9 is a rear perspective view of the fill support grid hanger of FIG. 7.

Referring to FIGS. 7-9, a fill support grid hanger 101 according to a first embodiment of the invention features an elongated rail 103, having a first, horizontal structural member-facing, side 105, and a second, fill support grid-facing, side 107. At a top portion of the first side 105, the rail features a flange 109 configured to rest atop a corresponding flange of a horizontal structural member. The first side 105 also features a plurality of integrally formed blocks 111 spaced along the rail 103 and dimensioned and configured to contact the vertical portion of the horizontal structural member and prevent undue flexing of the fill support grid hanger 101 toward and away from the horizontal structural member. The tops 113 of blocks 111 may be a single flat surface, or they may have two stepped flat surfaces. In either event, at least a portion of the tops 113 of blocks 111 are spaced a distance from the bottom of flange 109 to form a discontinuous flange channel 114 dimensioned to permit a slip fit of a top flange of the horizontal structural member between the bottom of flange 109 and top portions 113 of blocks 111. The first side 105 may optionally feature recesses 115 along its length. Similarly, the blocks 111 may define recesses 117 on their girt-facing sides.

On the second, fill-support grid facing, side 107, the fill support grid hanger 101 is provided with grid supports 119 configured to receive and inhibit lateral movement of at least two different types of fill support grid. The grid supports 119 are spaced from one-another to form front grooves or channels 120 configured to receive the vertical portions of the fill support grid. According to a preferred embodiment, grid supports 119 may be U-shaped. According to a further preferred embodiment, the grid supports 119 may define a discontinuous slot 121 that runs the length of the fill support grid hanger, the discontinuous slot 121 optionally having a keyhole shape, and further optionally configured to receive at a bottom of said key-hole shape a horizontal bar of a particular type of fill support grid in a snap fit. According to a further preferred embodiment of the invention, the discontinuous slot 121 is formed on the back sides 123 of the grid supports 119. The back sides 123 may have a tapered portion. According to a further embodiment, the fill support grid hanger 101 may be provided with bores 125 located and spaced appropriately to receive screws or bolts to secure the fill support grid to the fill support grid hanger and/or to the horizontal structural member.

Figure 10:
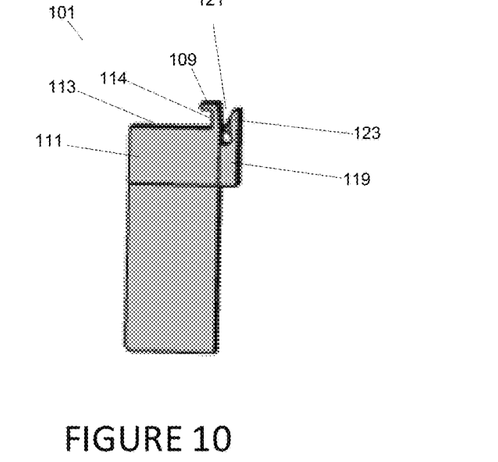
FIG. 10 is a side view of a fill support grid hanger according to a second embodiment of the invention.
Figure 11:
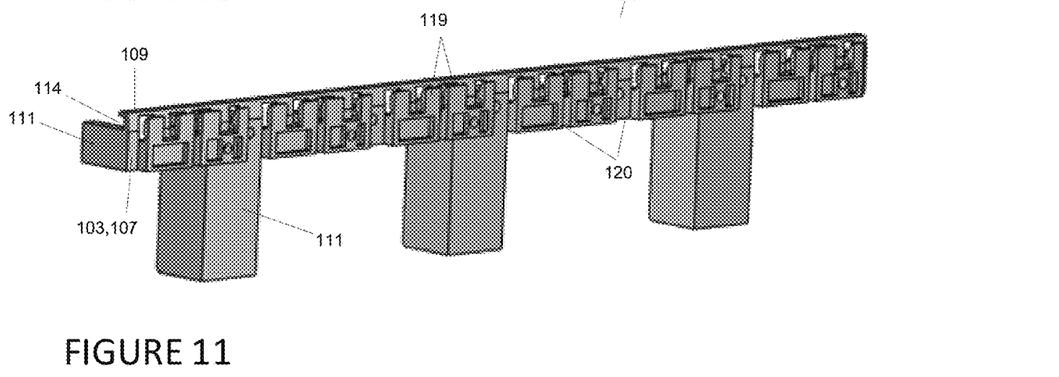
FIG. 11 is a front perspective view of the fill support grid hanger of FIG. 10.
Figure 12:
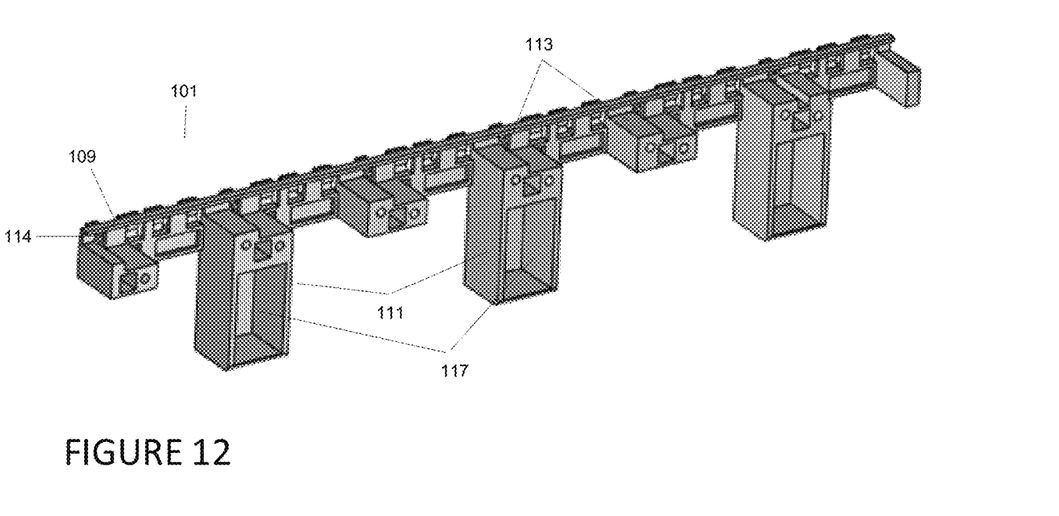
FIG. 12 is a rear perspective view of the fill support grid hanger of FIG. 10.

Referring to FIGS. 10-12, an alternate embodiment is adapted for attachment to horizontal structural members having a wider span between upper and lower flanges, and where the desired or appropriate location for securing the fill support grid is between the two flanges. In most respect, this embodiment is identical to the embodiment of FIGS. 7-9. However, according to the embodiment shown in FIGS. 10-12, some or all of the integrally formed blocks 111 may extend downward from the bottom of the rail portion 103 to rest on the lower flange of the horizontal structural member and support the fill support grid hanger 101 an appropriate distance above the lower flange.

Figure 13:
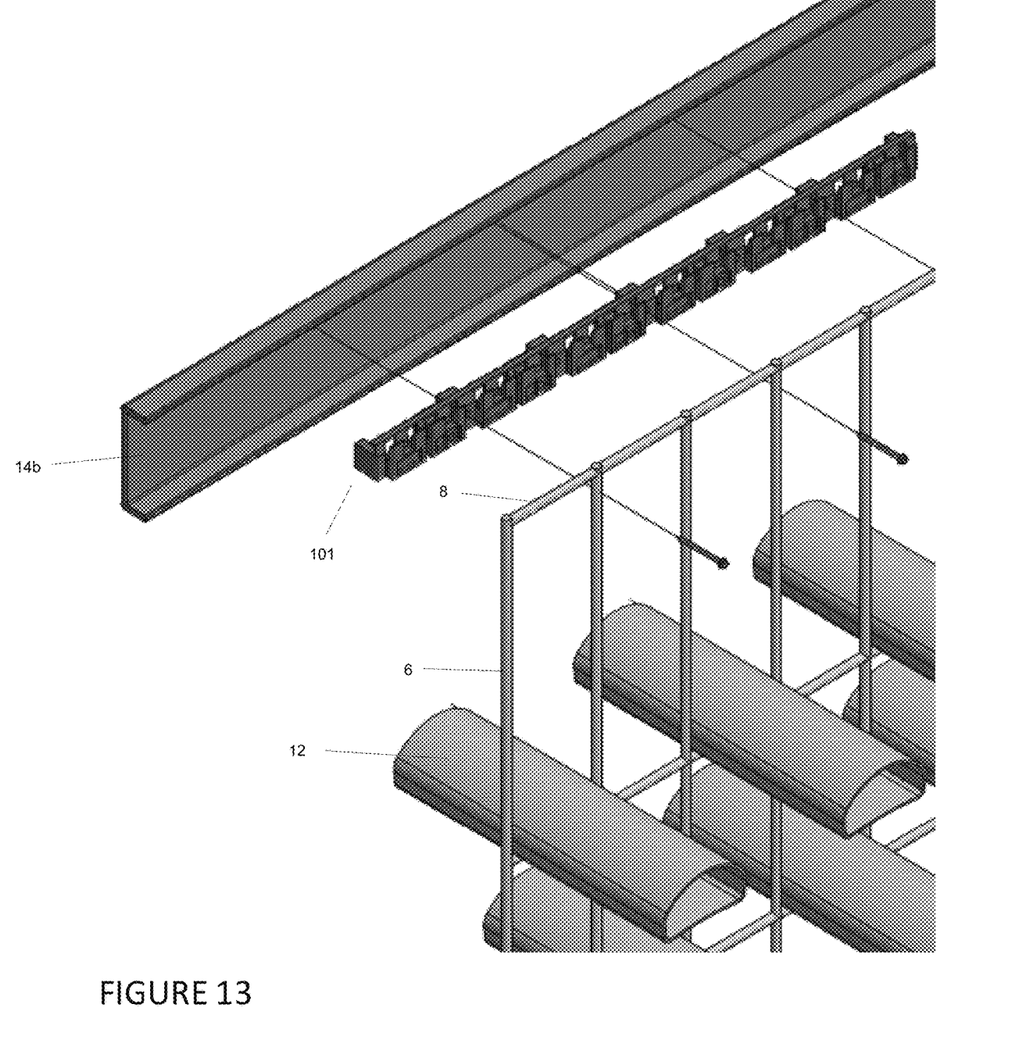
FIG. 13 is an exploded view of a fill support grid attachment to a cooling tower horizontal structural member using the fill support grid hanger of FIG. 7.
Figure 14:
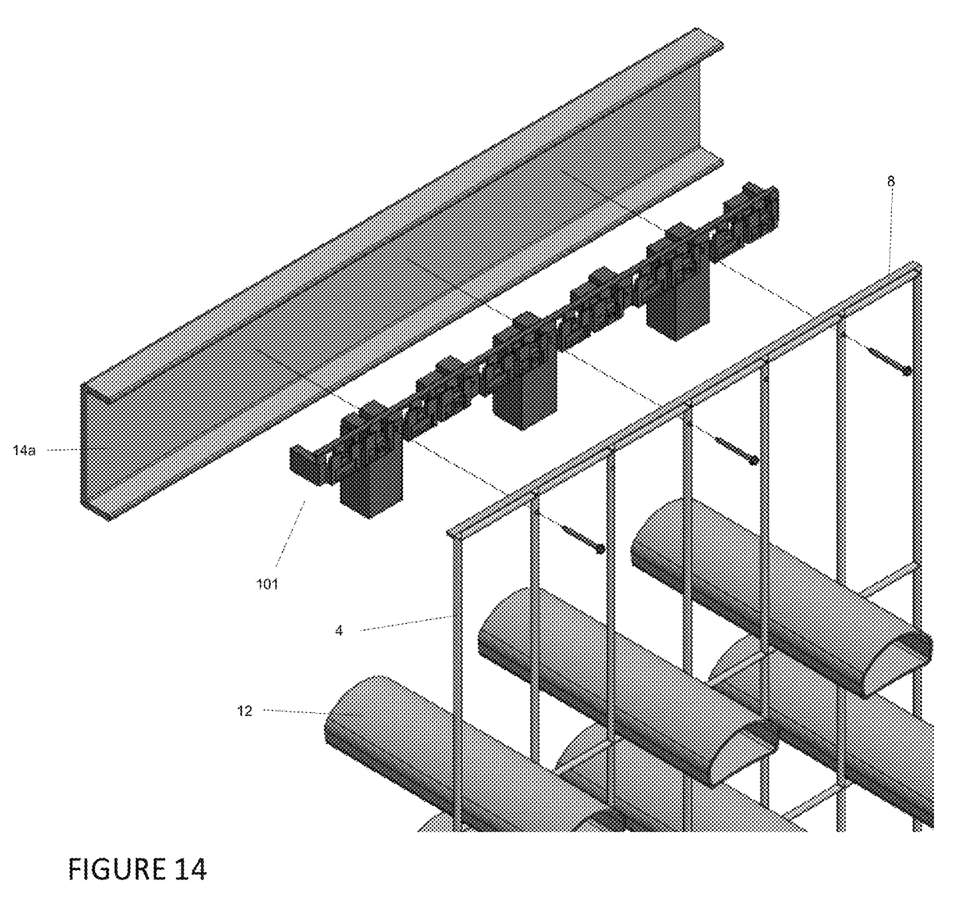
FIG. 14 is an exploded view of a fill support grid attachment to a cooling tower horizontal structural member using the fill support grid hanger of FIG. 10.
Figure 15:
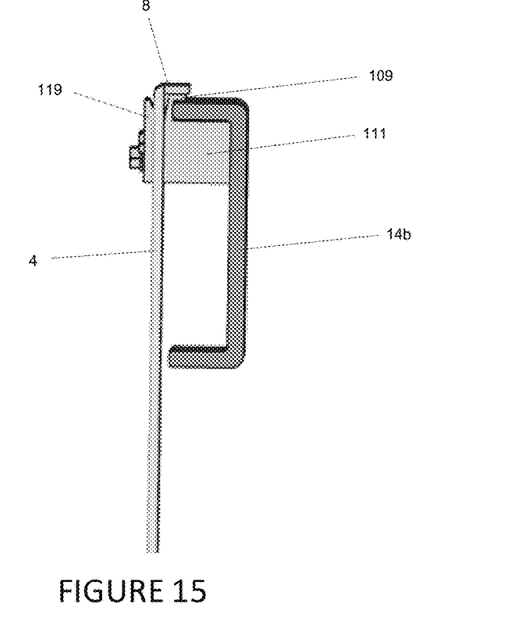
FIG. 15 is a side view of a first type of fill support grid attached to a cooling tower horizontal structural member using the fill support grid hanger of FIG. 7.

FIG. 13 shows how the embodiment of FIGS. 7-9 is used to connect a fill support grid directly to a standard sized cooling tower horizontal structural member without an intervening spacer bar. FIGS. 14 and 15 show how the embodiment of FIGS. 10-12 is used to connect a fill support grid directly to a tall cooling tower horizontal structural member without an intervening spacer bar.

Figure 16:
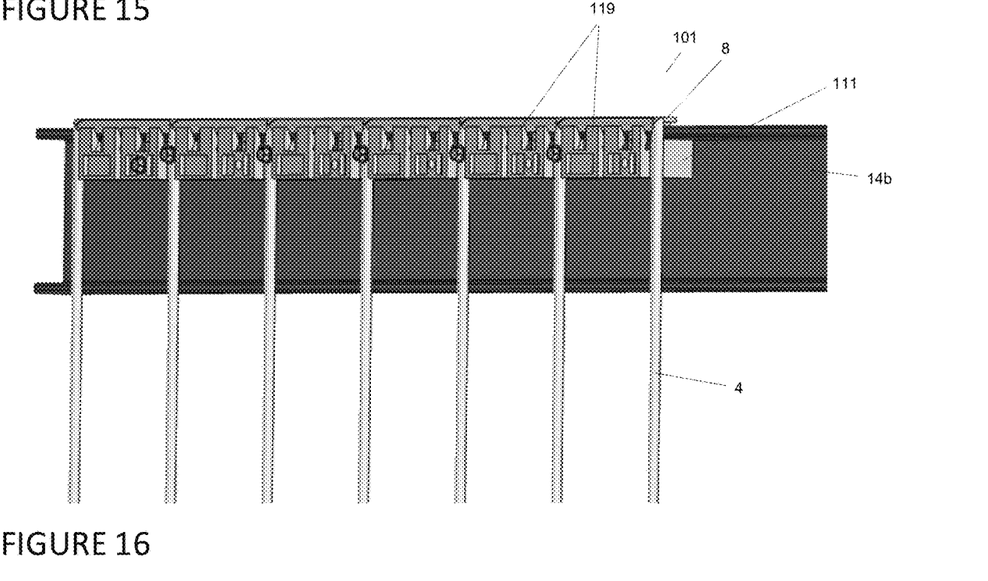
FIG. 16 is a perspective view of a first type of fill support grid attached to a cooling tower horizontal structural member using the fill support grid hanger of FIG. 7.

FIG. 15 is a side view of the embodiment of FIGS. 7-9 fixed to a standard sized cooling tower horizontal structural member without an intervening spacer bar, from which is hung a first type of fill support grid having a top flange, the top flange resting atop flange 109. FIG. 16 is a perspective view of the arrangement shown in FIG. 15 showing how the vertical bars of the fill support grid fit in channels 120 formed between the grid supports 119.

Figure 17:
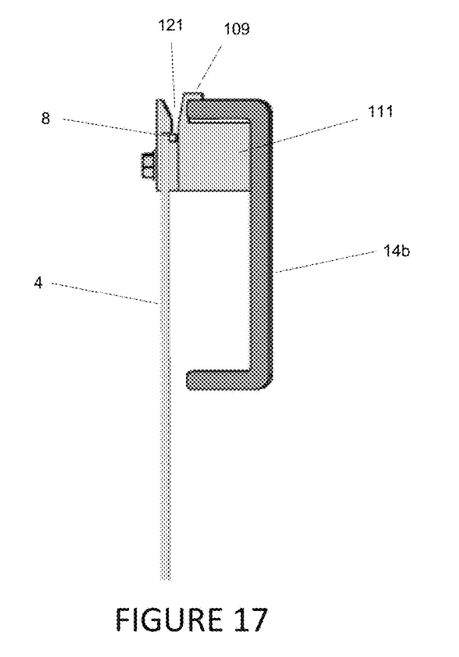
FIG. 17 is a side view of a second type of support grid attached to a cooling tower horizontal structural member using the fill support grid hanger of FIG. 7.
Figure 18:
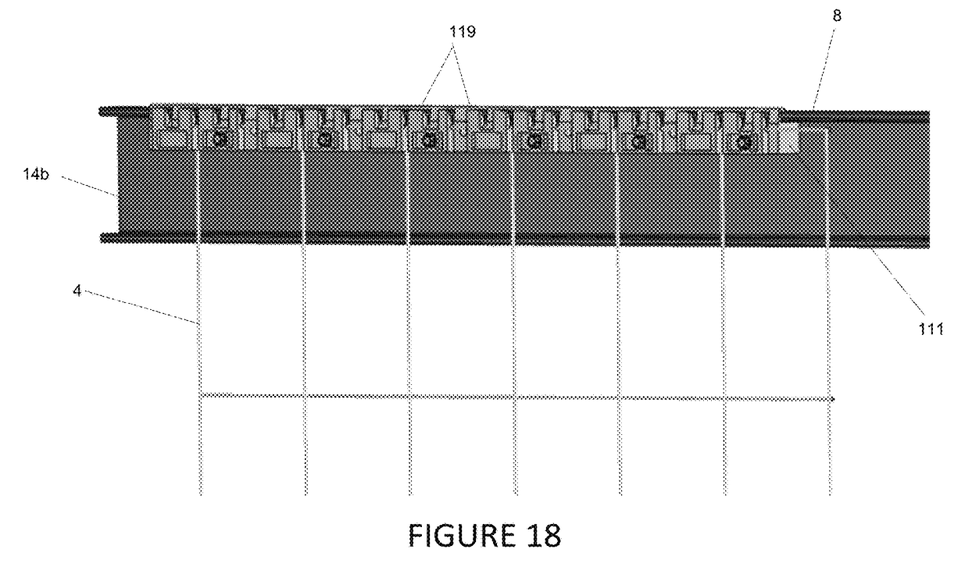
FIG. 18 is a perspective view of a second type of fill support grid attached to a cooling tower horizontal structural member using the fill support grid hanger of FIG. 7.

FIG. 17 is a side view of the embodiment of FIGS. 7-9 fixed to a standard sized cooling tower horizontal structural member without an intervening spacer bar, from which is hung a second type of fill support grid, typically made from wire, where the top horizontal part of the grid is snap fit into a bottom "keyhole" portion of channel 121. FIG. 18 is a perspective view of the arrangement shown in FIG. 17 showing how the vertical bars of the fill support grid fit in channels 120 formed between the grid supports 119.

The description of the invention is merely exemplary in nature and, thus, variations that do not depart from the concepts disclosed herein are intended to be within the scope of the invention. Any variations from the specific embodiments described herein but which otherwise embody the features described herein should not be regarded as a departure from the spirit and scope of the invention set forth in the following claims.

The invention claimed is:

1. A cooling tower fill support grid hanger for securing a fill support grid to a cooling tower horizontal structural member, the cooling tower fill support grid hanger comprising a longitudinal body having a back surface and a front surface, a top portion of the back surface comprising a flange extending from the back surface, a lower portion of the back surface comprising a plurality of integrally formed blocks extending away from the back surface, said flange and said plurality of blocks forming a first discontinuous channel dimensioned and configured to receive a cooling tower horizontal structural member flange; said front surface comprising a plurality of grid supports spaced from one-another along said front surface.

2. The cooling tower fill support grid hanger according to claim 1, wherein said plurality of blocks also extend downward beyond a bottom surface of said longitudinal body, and wherein said downward extension is dimensioned and configured to support said fill support grid hanger on a bottom flange of cooling tower horizontal structural member.

3. The cooling tower fill support grid hanger according claim 1, wherein said plurality of grid supports define a plurality of channels configured and dimensioned to receive vertical portions of a cooling tower fill support grid.

4. The cooling tower fill support grid hanger according claim 1, wherein said plurality of grid supports define a second discontinuous channel between back surfaces of said plurality of grid supports and said front surface of said longitudinal body, said second discontinuous channel configured and dimensioned to receive a horizontal portion of a cooling tower fill support grid.

5. The cooling tower fill support grid hanger according claim 1, wherein said back surfaces of said plurality of grid supports are tapered.

6. The cooling tower fill support grid hangers according claim 1, wherein said plurality of grid supports are each U-shaped.

7. The cooling tower fill support grid hangers according claim 1, wherein said plurality of blocks have a step-shaped top surface.

8. The cooling tower fill support grid hangers according claim 1, wherein front faces of said grid supports define recesses.

9. The cooling tower fill support grid hangers according claim 1, wherein rear faces of said blocks define recesses.

\* \* \* \* \*